(12) United States Patent
Hallack et al.

(10) Patent No.: US 11,254,819 B2
(45) Date of Patent: Feb. 22, 2022

(54) CURING AGENT MIXTURE

(71) Applicant: Evonik Operations GmbH, Essen (DE)

(72) Inventors: Markus Hallack, Schermbeck (DE); Mona Seyfried, Essen (DE); Berend-Jan de Gans, Muelheim an der Ruhr (DE); Florian Düllmann, Hagen (DE); Sascha Herrwerth, Freigericht (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/949,320

(22) Filed: Oct. 26, 2020

(65) Prior Publication Data
US 2021/0122921 A1 Apr. 29, 2021

(30) Foreign Application Priority Data
Oct. 28, 2019 (EP) .................................. 19205611

(51) Int. Cl.
*C08L 83/04* (2006.01)
*C08K 5/544* (2006.01)
*C09D 11/102* (2014.01)
*C09K 3/10* (2006.01)
*C08K 5/31* (2006.01)
*C08K 5/5415* (2006.01)
*C09D 183/04* (2006.01)
*C08G 77/00* (2006.01)

(52) U.S. Cl.
CPC ............... *C08L 83/04* (2013.01); *C08K 5/31* (2013.01); *C08K 5/544* (2013.01); *C08K 5/5415* (2013.01); *C09D 11/102* (2013.01); *C09D 183/04* (2013.01); *C09K 3/1018* (2013.01); *C08G 77/80* (2013.01); *C08L 2205/025* (2013.01); *C09K 2200/0685* (2013.01)

(58) Field of Classification Search
CPC ...... C08L 83/04; C09D 183/04; C09J 183/04; C08K 5/544; C08K 5/31
See application file for complete search history.

(56) References Cited

U.S. PATENT DOCUMENTS

| | | | |
|---|---|---|---|
| 4,271,190 A | 6/1981 | Bertelmann et al. | |
| 5,041,655 A | 8/1991 | Huthmacher et al. | |
| 6,794,445 B2 | 9/2004 | Reusmann et al. | |
| 7,442,666 B2 | 10/2008 | Herrwerth et al. | |
| 7,598,334 B2 | 10/2009 | Ferenz et al. | |
| 7,605,284 B2 | 10/2009 | Brueckner et al. | |
| 7,727,599 B2 | 6/2010 | Doehler et al. | |
| 7,759,402 B2 | 7/2010 | Venzmer et al. | |
| 7,825,207 B2 | 11/2010 | Ferenz et al. | |
| 7,893,128 B2 | 2/2011 | Busch et al. | |
| 8,247,525 B2 | 8/2012 | Schubert et al. | |
| 8,268,939 B2 | 9/2012 | Ebbrecht et al. | |
| 8,557,944 B2 | 10/2013 | Henning et al. | |
| 8,772,423 B2 | 7/2014 | De Gans et al. | |
| 8,993,792 B2 | 3/2015 | Hartung et al. | |
| 9,138,385 B2 | 9/2015 | Dahl et al. | |
| 9,221,945 B2 | 12/2015 | Alzer et al. | |
| 9,353,225 B2 | 5/2016 | Knott et al. | |
| 9,353,289 B2 | 5/2016 | De Gans et al. | |
| 9,617,390 B2 | 4/2017 | Hinzmann et al. | |
| 9,663,622 B2 | 5/2017 | Hinzmann et al. | |
| 9,765,009 B2 | 9/2017 | Burdeniuc et al. | |
| 9,790,327 B2 | 10/2017 | Klotzbach et al. | |
| 9,796,876 B2 | 10/2017 | Lomoelder et al. | |
| 9,902,096 B2 | 2/2018 | Stapperfenne et al. | |
| 10,100,148 B2 | 10/2018 | Emmrich-Smolczyk et al. | |
| 10,100,207 B2 | 10/2018 | Stache et al. | |
| 10,239,898 B2 | 3/2019 | Hallack et al. | |
| 10,464,876 B2 | 11/2019 | Burdeniuc et al. | |
| 10,626,131 B2 | 4/2020 | Kreczinski et al. | |
| 10,626,291 B2 | 4/2020 | Hallack et al. | |
| 10,633,555 B2 | 4/2020 | Stache et al. | |
| 10,844,009 B2 | 11/2020 | Stahl et al. | |
| 11,021,608 B2 | 6/2021 | Seyfried et al. | |
| 2003/0198819 A1 | 10/2003 | Reusmann et al. | |
| 2005/0059772 A1 | 3/2005 | Horikoshi et al. | |
| 2005/0136269 A1 | 6/2005 | Doehler et al. | |

(Continued)

FOREIGN PATENT DOCUMENTS

DE 32 20 393 12/1983
DE 10 2004 001 407 7/2005

(Continued)

OTHER PUBLICATIONS

Abstract for JP 52-91998 (no date).*

(Continued)

*Primary Examiner* — Marc S Zimmer
(74) *Attorney, Agent, or Firm* — Grüneberg and Myers PLLC

(57) ABSTRACT

A curing agent mixture is for coatings that cure at room temperature. The curing agent mixture can include (A) 10-60% by weight, preferably 20-60% by weight, more preferably 30-50% by weight, of a polysiloxane, (B) 40-90% by weight, preferably 40-80% by weight, more preferably 40-70% by weight, of an amino-functional alkoxysilane and (C) 1-10% by weight, preferably 2-7% by weight, more preferably 3-5% by weight, of a guanidine compound. The stated amounts of components (A), (B), and (C) add up to 100% by weight and are based on the curing agent mixture.

22 Claims, 5 Drawing Sheets

(56) References Cited

U.S. PATENT DOCUMENTS

| | | |
|---|---|---|
| 2006/0041097 A1 | 2/2006 | Herrwerth et al. |
| 2006/0155089 A1 | 7/2006 | Ferenz et al. |
| 2006/0188455 A1 | 8/2006 | Ferenz et al. |
| 2007/0059539 A1 | 3/2007 | Doehler et al. |
| 2007/0100153 A1 | 5/2007 | Brueckner et al. |
| 2007/0203307 A1 | 8/2007 | Cavaleiro et al. |
| 2007/0287765 A1 | 12/2007 | Busch et al. |
| 2007/0299231 A1 | 12/2007 | Doehler et al. |
| 2008/0064782 A1 | 3/2008 | Doehler et al. |
| 2008/0251200 A1 | 10/2008 | Kimura et al. |
| 2009/0093598 A1 | 4/2009 | Venzmer et al. |
| 2010/0034765 A1 | 2/2010 | Herrwerth et al. |
| 2010/0036011 A1 | 2/2010 | De Gans et al. |
| 2010/0184913 A1 | 7/2010 | Ebbrecht et al. |
| 2011/0281973 A1 | 11/2011 | Schubert et al. |
| 2012/0071564 A1 | 3/2012 | De Gans et al. |
| 2012/0097883 A1 | 4/2012 | Henning et al. |
| 2012/0134948 A1 | 5/2012 | Springer et al. |
| 2013/0131276 A1 | 5/2013 | Burdeniuc et al. |
| 2013/0204021 A1 | 8/2013 | Hartung et al. |
| 2013/0259821 A1 | 10/2013 | Henning et al. |
| 2013/0331592 A1 | 12/2013 | Hartung et al. |
| 2014/0134125 A1 | 5/2014 | Dahl et al. |
| 2015/0057412 A1 | 2/2015 | Knott et al. |
| 2015/0073069 A1 | 3/2015 | De Gans et al. |
| 2015/0094419 A1 | 4/2015 | Alzer et al. |
| 2015/0191625 A1 | 7/2015 | Lomoelder et al. |
| 2015/0321393 A1 | 11/2015 | Stapperfenne et al. |
| 2016/0108280 A1 | 4/2016 | Hallack et al. |
| 2016/0185918 A1 | 6/2016 | Hinzmann et al. |
| 2016/0208050 A1 | 7/2016 | Klotzbach et al. |
| 2016/0222169 A1 | 8/2016 | Hinzmann et al. |
| 2016/0297974 A1 | 10/2016 | Stache et al. |
| 2016/0304666 A1 | 10/2016 | Emmrich-Smolczyk et al. |
| 2017/0007562 A1 | 1/2017 | Rademacher-Heilshorn et al. |
| 2017/0298250 A1 | 10/2017 | Anselmann et al. |
| 2018/0065913 A1 | 3/2018 | Burdeniuc et al. |
| 2018/0179234 A1 | 6/2018 | Hallack et al. |
| 2019/0048224 A1 | 2/2019 | Stache et al. |
| 2019/0106581 A1 | 4/2019 | Michael et al. |
| 2019/0241741 A1 | 8/2019 | Seyfried et al. |
| 2019/0300549 A1 | 10/2019 | Kreczinski et al. |
| 2020/0207707 A1 | 7/2020 | Stahl et al. |
| 2020/0308406 A1 | 10/2020 | Seyfried et al. |

FOREIGN PATENT DOCUMENTS

| | | | |
|---|---|---|---|
| DE | 10 2004 034 740 | | 2/2006 |
| DE | 10 2005 001 040 | | 7/2006 |
| DE | 10 2005 002 716 | | 8/2006 |
| DE | 10 2005 004 676 | | 8/2006 |
| EP | 0 439 699 | | 8/1991 |
| EP | 1 464 675 | A2 | 10/2004 |
| EP | 1 464 675 | A3 | 10/2004 |
| EP | 3 719 076 | | 10/2020 |
| EP | 3 722 371 | | 10/2020 |
| JP | 52-91998 | * | 8/1977 |
| WO | 2004/020525 | | 3/2004 |
| WO | 2008/031456 | | 3/2008 |
| WO | 2009/047580 | | 4/2009 |
| WO | 2010/046181 | | 4/2010 |
| WO | 2013/156237 | | 10/2013 |
| WO | 2014/135353 | | 9/2014 |
| WO | 2015/144384 | | 10/2015 |
| WO | 2019/185408 | | 10/2019 |
| WO | WO 2020/109920 | * | 6/2020 |
| WO | 2021/122400 | | 6/2021 |

OTHER PUBLICATIONS

U.S. Appl. No. 17/457,944, filed Dec. 7, 2021, De Gans et al.
European Search Report dated May 13, 2020 in European Application No. 19205611.7.

* cited by examiner

CURING AGENT MIXTURE

CROSS-REFERENCE TO RELATED APPLICATIONS

The present application claims priority to European patent application EP 19205611.7, filed Oct. 28, 2019, the content of which is hereby incorporated by reference in its entirety.

BACKGROUND OF THE INVENTION

Field of the Invention

The present invention relates to a curing agent mixture for coatings that cure at room temperature, for example lacquers, paints, inks, coverings, sealants and adhesives and to the production process and use thereof.

Description of Related Art

In the field of paint and lacquer applications, silicone resin compositions have long been known as binders that can be induced to cure by means of a hydrolysis and condensation mechanism. This is generally accomplished with a curing agent or a crosslinker based on amino-functional alkoxysilanes.

Amino-functional alkoxysilanes, referred to as aminosilanes for short, are used inter alia as adhesion promoters, as crosslinkers for curable masses and as structural elements of silane-functional polymers. Most widespread are aminosilanes having primary amino groups ("primary aminosilanes"), but these have some disadvantages. Because of the relatively hydrophilic primary amino group, they tend to absorb moisture, which has an adverse effect on storage and processing. Thus, they must be stored with the exclusion of moisture and must be used up completely during processing. Leftover amounts cannot normally be used further.

The areas of use of these amino-functional alkoxysilanes extend from weather protection of built structures to adhesion-promoting properties in the glass fibre industry to sealants and adhesives, paints and lacquers, and modification of polymeric materials. Their mechanism of action is based on the formation of siloxane linkages with the substrate. The presence of atmospheric humidity or the addition of water results first in the hydrolysis of the alkoxy substituents of the trialkoxysilane and the formation of corresponding silanols. These silanol groups can then react with hydroxyl groups on the surface of the material to be modified, with the elimination of water, and crosslink via further silanol groups to form siloxane units.

To accelerate such crosslinking reactions, catalysts are often used.

The use of aminosilanes as additives in moisture-curing compositions based on silane-functional polymers is known. They are normally employed to selectively influence properties such as adhesion, storage stability and reactivity, as described for example in U.S. Pat. Nos. 3,979,344, 5,147,927 and EP 0 819 749 A1.

U.S. Pat. No. 6,703,453 discloses moisture-curing compositions based on silane-functional polymers that contain inter alia an adduct of an aminosilane and maleic or fumaric esters.

EP 2 013 305 discloses a moisture-curing composition based on a silane-functional polymer and a reaction product produced from an aminosilane and a silane group-free alkene in order to improve the adhesion properties of said composition.

In order not to lower the storage stability of such a polymer composition and to prevent unwanted premature hardening, the principal constituents, these being the polymer composition and the curing agent composition, are stored in separate containers in which they are both storage stable at room temperature. The two components are not mixed together until shortly before or during application, whereupon crosslinking/curing of the polymer composition occurs.

Curing agent compositions of the current related art often contain silicone polymers as extender polymers. These are mostly vinyl- or trimethylsilyl-functional polydimethylsiloxanes. The compatibility of, for example, crosslinkers or adhesion promoters with these polymers is not always sufficient, which means there is a risk of phase separation. Such curing agent compositions are generally rheologically stabilized, i.e. a stable paste is formulated with rheologically active fillers to prevent it from demixing too easily.

Separation of a liquid phase at the surface is sufficiently known in many curing agent compositions.

The term "separation" used here refers to an autonomous separation of components in a substance mixture or preparation caused by inadequate compatibility or by the individual components having different densities. Depending on the density of the component(s) that are separating, these can be mostly observed either as accumulation at the surface or at the base. This characteristic can also be described by means of the term "homogeneity", i.e. the uniformity of the bulk material. The term "inhomogeneous" is thus used for mixtures or preparations in which a phase forms that is different from the major part of the mass. This can for example be the separation of an oily or liquid component. In the case of mixtures of liquid substances, this may be the visible formation of a phase boundary between insoluble or incompatible components.

Since ready-to-use self-adhesive compositions generally need to contain adhesion promoters in a content of about 1% and crosslinkers in an amount of approx. 3-5%, this means that, by way of example, curing agent compositions for 2-component systems for a 9:1 mixing ratio of polymer composition and curing agent contain approximately 10 times higher concentrations in the curing agent composition. This makes the problem of phase separation of individual components all the more acute.

WO 2010/057963 A1 (US2012022209A1) discloses a curing agent composition that can contain vinyl-terminated polydimethylsiloxane for rheological stabilization, for example carbon black and silica, and also crosslinkers and adhesion promoters. This additional rheological stabilization can slow the separation of constituents of the curing agent composition. However, the presence of carbon black and silica is not desirable in all coatings.

In DE 32 06 474 A1 (US490500A), the constituents of the curing agent composition, alkyl silicate, catalyst, and adhesion promoter, are reacted in a prior reaction to achieve compatibility of the components. This has the disadvantage that a laborious additional chemical process needs to be carried out.

BRIEF SUMMARY OF THE INVENTION

The object of the present invention was therefore to provide ready-to-use curing agent compositions that remain homogeneous during storage and show no separation and do not first need to undergo a laborious chemical reaction in an additional process step.

This object was achieved by the inventive curing agent mixture according to below embodiments.

1. Curing agent mixture for coatings that cure at room temperature, comprising
   (A) 10-60% by weight, preferably 20-60% by weight, more preferably 30-50% by weight, of a polysiloxane,
   (B) 40-90% by weight, preferably 40-80% by weight, more preferably 40-70% by weight, of an amino-functional alkoxysilane and
   (C) 1-10% by weight, preferably 2-7% by weight, more preferably 3-5% by weight, of a guanidine compound,
   wherein the stated amounts of components (A), (B) and (C) add up to 100% by weight and are based on the curing agent mixture.
2. Curing agent mixture according to embodiment 1, characterized in that the weight ratio A:B is from 1:9 to 3:2, preferably from 1:4 to 3:2 and more preferably 3:7 to 3:2.
3. Curing agent mixture according to any of the preceding embodiments, characterized in that component (A) is a compound of the general formula (I)

$$R_a Si(OR')_b O_{(4-a-b)/2} \quad (1)$$

in which a and b are independently greater than 0 to less than or equal to 2, and the sum a+b is less than 4, and R is independently identical or different linear or branched, saturated or else mono- or polyunsaturated or aromatic hydrocarbon radicals,
R' is an alkyl group consisting of 1 to 8 carbon atoms.
4. Curing agent mixture according to any of the preceding embodiments, characterized in that component (A) is a compound of the general formula (I), where R is phenyl and methyl groups and R' is a methyl group.
5. Curing agent mixture according to embodiment 4, characterized in that the numerical phenyl to methyl ratio, based on the number of moles in component (A), is generally in the range from 1:0.1 to 0.1:1, preferably in the range from 0.5:1 to 1:0.5.
6. Curing agent mixture according to any of the preceding embodiments, characterized in that component (B) is an amino-functional alkoxysilane of the general formula (II)

$$R^1{}_2{-}N{-}R^3{-}SiR^1{}_x(OR^2)_{3-x} \quad (II)$$

where
   $R^1$ is identically or independently hydrogen, an alkyl, isoalkyl, tert-alkyl, cycloalkyl or aryl group having 1-10 carbon atoms, $NH_2$—$(CH_2)_2$— or $(R^2O)_3Si$—$R^3$—,
   where x=0, 1 or 2, and
   $R^2$ is independently hydrogen, an alkyl or isoalkyl group having 1-8 carbon atoms, and
   $R^3$ is a linear or branched alkylene group having 1-20 carbon atoms.
7. Curing agent mixture according to any of the preceding embodiments, characterized in that component (B) is 3-aminopropyltriethoxysilane, 3-aminopropyltrimethoxysilane, 3-aminopropylmethyldiethoxysilane, N-(n-butyl)-3-aminopropyltrimethoxysilane, N-(2-aminoethyl)-3-aminopropyltrimethoxysilane, bis[3-triethoxysilylpropyl]amine, bis[3-trimethoxysilylpropyl]amine or bis[3-trimethoxysilylpropyl-N-ethyl]amine.
8. Curing agent mixture according to any of the preceding embodiments, characterized in that component (C) is a guanidine compound of the general formula (III)

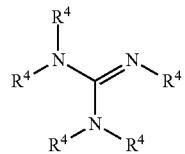

(III)

in which
   $R^4$ is independently identical or different and is hydrogen, linear or branched or cyclic hydrocarbons having 1 to 15 carbon atoms, wherein the hydrocarbons may also include 1 or 2 heteroatoms. Preferred heteroatoms are oxygen and nitrogen.
9. Curing agent mixture according to any of the preceding embodiments, characterized in that component (C) is 1,1,3,3-tetramethylguanidine or 2-tert-butyl-1,1,3,3-tetramethylguanidine.
10. Curing agent mixture according to any of the preceding embodiments, characterized in that die viscosity measured in accordance with DIN 53019 is between 5-25 mPa·s, preferably between 7-20 mPa·s, and more preferably between 8-15 mPa·s.
11. Method for producing the curing agent mixture according to any of the preceding embodiments, characterized in that the components are mixed under nitrogen.
12. Curing agent mixture according to embodiment 11, characterized in that component A is initially charged, with component B then added with constant stirring, followed by the addition of component C.
13. Use of a curing agent mixture according to any of embodiments 1-10 for curing curable compositions comprising at least one polymer that is silyl-functional.
14. Use of a curing agent mixture according to any of embodiments 1-10 for curing curable compositions in accordance with the compound of the general formula (I).
15. Coatings, lacquers, paints, inks, coverings, sealants, adhesives, obtainable through the use of a curing agent mixture according to any of the preceding embodiments.

The present invention accordingly provides a curing agent mixture for coatings that cure at room temperature, comprising
   (A) 10-60% by weight, preferably 20-60% by weight, more preferably 30-50% by weight, of a polysiloxane,
   (B) 40-90% by weight, preferably 40-80% by weight, more preferably 40-70% by weight, of an amino-functional alkoxysilane and
   (C) 1-10% by weight, preferably 2-7% by weight, more preferably 3-5% by weight, of a guanidine compound,
wherein the stated amounts of components (A), (B) and (C) add up to 100% by weight and are based on the curing agent mixture.

DETAILED DESCRIPTION OF THE INVENTION

Figure 1:
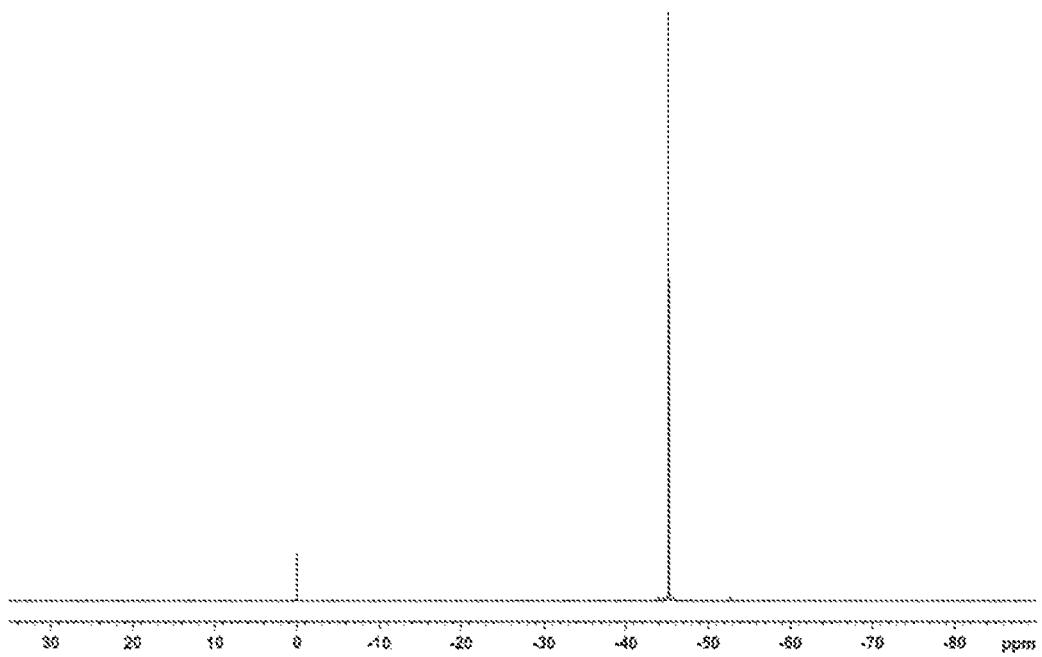
FIG. 1 shows the $^{29}$Si-NMR spectrum of CD1. A small signal at −53 ppm indicates a small amount of dimer in the raw material.

The inventive curing agent mixture has the advantage that it remains homogeneous during storage and shows no separation. Also, the use of leftover amounts of curing agent mixture is possible even when containers were already opened.

The terms "storage stable" or "storable" are used to refer to a substance or a composition when it can be stored at room temperature in a suitable container for relatively long periods, typically at least 3 to 6 months and longer, without becoming visibly turbid or inhomogeneous and without this storage resulting in a change in its application or use properties, particularly in its viscosity and crosslinking rate, to a degree relevant to its use.

"Room temperature" refers to a temperature of approx. 23° C.

It is known that curing through reaction with atmospheric humidity causes a polymer composition to cure from the outside inwards, starting with the formation of a skin on the surface of the composition. The so-called skin formation time is a measure of the curing rate of the composition. The condensation and the stability of aminosilanes, polysiloxanes and silicone resins in contact with atmospheric humidity is a complicated process influenced by a number of factors. The first reaction is the elimination of a molecule of alkanol—normally methanol or ethanol—through reaction with a molecule of water. The second reaction is the formation of a Si—O—Si linkage. In some cases, the reaction with water is the rate-determining step, particularly when the atmospheric humidity is low.

Low-molecular-weight aminosilanes in contact with atmospheric humidity initially form dimers and oligomers, but no skin, because diffusion away from the air interface of the resulting oligomers in the low-molecular-weight aminosilane proceeds much more rapidly than the reaction with water. By contrast, the diffusion rate in high-molecular-weight and viscous polysiloxanes such as silicone resins is slower than the reaction with water. In contact with atmospheric humidity, this results in the formation of a skin consisting of crosslinked material, with the siloxane then reacting further all the way down to the substrate.

It has now surprisingly been found that, in contact with atmospheric humidity, the inventive curing agent mixtures likewise form no skin. Without being bound to any particular theory, it is assumed that the low-viscosity aminosilane acts as a solvent for the high-molecular-weight polysiloxane, allowing diffusion away from the air interface before a skin can form.

Attempts have been made to explain the stability of the inventive curing agent mixture on the basis of the dimerization of component (B). Clearly, the dimerization of component (B) was avoided/reduced by the inventive curing agent mixture. Reference is here made to the examples described below.

Preferably, the curing agent mixture has a weight ratio of component A to component B from 1:9 to 3:2, preferably from 1:4 to 3:2 and more preferably 3:7 to 3:2.

The inventive curing agent mixture preferably contains, as component (A), a compound of the general formula (I)

$$R_a Si(OR')_b O_{(4-a-b)/2} \quad (I)$$

in which a and b are independently greater than 0 to less than or equal to 2, and the sum a+b is less than 4, and R is independently identical or different linear or branched, saturated or else mono- or polyunsaturated or aromatic hydrocarbon radicals, R' is an alkyl group consisting of 1 to 8 carbon atoms.

Preferably, the radicals R independently are saturated, branched or unbranched alkyl radicals having 1 to 17 carbon atoms and/or are mono- or polyunsaturated, branched or unbranched alkenyl radicals having 2 to 17 carbon atoms or aromatic groups having 6 to 12 carbon atoms. More preferably the alkyl and alkenyl radicals have up to 12, more preferably up to 8, carbon atoms. Most preferably, all radicals R are either methyl and/or phenyl.

Preferred radicals R' are methyl, ethyl, propyl, isopropyl, n-butyl, sec-butyl or tert-butyl groups. R' is preferably selected from methyl or ethyl groups. The latter are especially suitable for phenylpolysiloxanes designated HAPS-free (hazardous air pollutant substance-free), which do not contain solvents such as toluene, xylene or benzene and which, during catalytic hydrolysis-condensation crosslinking at room temperature, release only ethanol and no methanol.

Compounds of the formula (I) are often also referred to as silicone resins. This formula relates to the smallest unit of the averaged structural formula of the silicone polymer. The number of repeat units can be established from the number-average Mn determined by GPC.

The production of such silicone resins has long been known in the literature (see for example W. Noll—Chemie und Technologie der Silicone [Chemistry and Technology of the Silicones], Wiley-VCH Verlag GmbH & Co. KGaA, Weinheim, 1960) and is also described in the German patent specification DE 34 12 648.

Preferred compounds of the general formula (I) have methyl and/or ethyl groups as radical R, with an alkoxy functionality of 3% to 40% by weight, preferably 5% to 35% by weight, more preferably 7% to 30% by weight, based on the total mass of the compound.

The molecular weight of the compound of the general formula (I) is preferably Mw 100 to 20 000 g/mol, more preferably 200 to 10 000 g/mol, even more preferably 200 to 3000 g/mol, particularly preferably 300 to 2000 g/mol.

Very particularly preferred are compounds of the general formula (I) where R is methyl, known as methyl silicone resins, having an alkoxy functionality of 7% to 35% by weight based on the total mass of the compound and a weight-average molar mass of 300 to 2000 g/mol.

In another preferred embodiment of the inventive curing agent mixture, component (A) comprises phenyl(alkoxysiloxanes)/phenylsilicone resins where R is phenyl, known as phenyl resins.

The proportion of alkoxy groups in the phenyl resins is preferably 1% to 40% by weight based on the polysiloxane, more preferably 3% to 35% by weight and most preferably 5% to 30% by weight.

Further preferably, the molecular weight Mw of the phenyl resins is 200 to 10 000 g/mol, preferably 200 to 3000 g/mol, more preferably 300 to 2000 g/mol.

Most preferably, the molecular weight Mw of the phenyl resins is 700 to 2000 g/mol.

In another preferred embodiment of the inventive curing agent mixture, component (A) is a compound of the general formula (I) in which R comprises phenyl and methyl groups.

Most preferred methyl-phenyl resins have methoxy and/or ethoxy groups as alkoxy groups, the proportion of the alkoxy groups, more particularly of the methoxy and/or ethoxy groups, being at least 3% by weight based on the polysiloxane, preferably 1% to 40% by weight, more preferably 3% to 35% by weight and very particularly preferably 5% to 30% by weight.

The numerical phenyl to methyl ratio, based on the number of moles in the resin is preferably generally in the range from 1:0.1 to 0.1:1, preferably in the range from 0.5:1 to 1:0.5.

In addition, the inventive curing agent mixture preferably contains, as component (B), an amino-functional alkoxysilane of the general formula (II)

$$R^1{}_2\!-\!N\!-\!R^3\!-\!SiR^1{}_x(OR^2)_{3-x} \quad\quad (II)$$

where
$R^1$ is identically or independently hydrogen, an alkyl, isoalkyl, tert-alkyl, cycloalkyl or aryl group having 1-10 carbon atoms, $NH_2$—$(CH_2)_2$— or $(R^2O)_3Si$—$R^3$—, and
$R^2$ is independently hydrogen, an alkyl or isoalkyl group having 1-8 carbon atoms, and
$R^3$ is a linear or branched alkylene group having 1-20 carbon atoms, and
x=0, 1 or 2.

$R^1$ is preferably an n-butyl group or a $NH_2$—$(CH_2)_2$— or $(R^2O)_3Si$—$R^3$— group.

Preferred alkyl groups for the $R^2$ radical are methyl, ethyl, propyl, isopropyl, n-butyl, sec-butyl and tert-butyl groups.

$R^3$ is preferably a butyl, propyl, ethyl or methylene group.

The term "secondary aminosilane" refers to an amino-functional alkoxysilane in which the radical directly attached to the silicon atom bears at least one secondary amino group. The term "primary aminosilane" refers to an amino-functional alkoxysilane in which the radical directly attached to the silicon atom bears at least one primary amino group.

The term "amino-functional alkoxysilane", or "aminosilane" for short, refers to a silicon-containing compound in which the silicon atom bears at least one, especially two or three alkoxy groups, plus a directly attached organic radical and thus contains at least one Si—C bond. The term "silyl group" refers to the silicon-containing group attached to the organic radical of an amino-functional alkoxysilane.

The term "primary amino group" refers to an $NH_2$ group attached to an organic radical, the term "secondary amino group" refers to an NH group attached to two organic radicals, which may also together form a ring, and the term "tertiary amino group" refers to an amino group in which the nitrogen atom ("tertiary amine nitrogen") is attached to three organic radicals, two of which may also together form a ring.

The term "moisture-curing" refers to a curable mass in which a polymer having silyl groups (silyl-functional polymer) may be cured predominantly via the reaction of the silyl groups with atmospheric water.

Such aminosilanes corresponding to formula (II) are preferably selected from 3-aminopropyltrimethoxysilane, 3-aminopropyltriethoxysilane, 2-aminoethyl-3-aminopropyltrimethoxysilane, 3-aminopropyl(diethoxymethoxysilane), 3-aminopropyl(tripropoxysilane), 3-aminopropyl(dipropoxymethoxysilane), 3-aminopropyl(tridodecanoxysilane), 3-aminopropyl(tritetradecanoxysilane), 3-aminopropyl(trihexadecanoxysilane), 3-aminopropyl(trioctadecanoxysilane), 3-aminopropyl(didodecanoxy)tetradecanoxysilane, 3-aminopropyl(dodecanoxy)tetradecanoxy(hexadecanoxy)silane, 3-aminopropyl(dimethoxymethylsilane), 3-aminopropyl(methoxydimethylsilane), 3-aminopropyl(hydroxydimethylsilane), 3-aminopropyl(diethoxymethylsilane), 3-aminopropyl(ethoxydimethylsilane), 3-aminopropyl(dipropoxymethylsilane), 3-aminopropyl(propoxydimethylsilane), 3-aminopropyl(diisopropoxymethylsilane), 3-aminopropyl(isopropoxydimethylsilane), 3-aminopropyl(dibutoxymethylsilane), 3-aminopropyl(butoxydimethylsilane), 3-aminopropyl(disiobutoxymethylsilane), 3-aminopropyl(isobutoxydimethylsilane), 3-aminopropyl(didodecanoxymethylsilane), 3-aminopropyl(dodecanoxydimethylsilane), 3-aminopropyl(ditetradecanoxymethylsilane), 3-aminopropyl(tetradecanoxydimethylsilane), 2-aminoethyl(trimethoxysilane), 2-aminoethyl(triethoxysilane), 2-aminoethyl(diethoxymethoxysilane), 2-aminoethyl(tripropoxysilane), 2-aminoethyl(dipropoxymethoxysilane), 2-aminoethyl(tridodecanoxysilane), 2-aminoethyl(tritetradecanoxysilane), 2-aminoethyl(trihexadecanoxysilane), 2-aminoethyl(trioctadecanoxysilane), 2-aminoethyl(didodecanoxy)tetradecanoxysilane, 2-aminoethyl(dodecanoxy)tetradecanoxy(hexadecanoxy)silane, 2-aminoethyl(dimethoxymethylsilane), 2-aminoethyl(methoxydimethylsilane), 2-aminoethyl(diethoxymethylsilane), 2-aminoethyl(ethoxydimethylsilane), 1-aminomethyl(trimethoxysilane), 1-aminomethyl(triethoxysilane), 1-aminomethyl(diethoxymethoxysilane), 1-aminomethyl(dipropoxymethoxysilane), 1-aminomethyl(tripropoxysilane), 1-aminomethyl(trimethoxysilane), 1-aminomethyl(dimethoxymethylsilane), 1-aminomethyl(methoxydimethylsilane), 1-aminomethyl(diethoxymethylsilane), 1-aminomethyl(ethoxydimethylsilane), 3-aminobutyl(trimethoxysilane), 3-aminobutyl(triethoxysilane), 3-aminobutyl(diethoxymethoxysilane), 3-aminobutyl(tripropoxysilane), 3-aminobutyl(dipropoxymethoxysilane), 3-aminobutyl(dimethoxymethylsilane), 3-aminobutyl(diethoxymethylsilane), 3-aminobutyl(dimethylmethoxysilane), 3-aminobutyl(dimethylethoxysilane), 3-aminobutyl(tridodecanoxysilane), 3-aminobutyl(tritetradecanoxysilane), 3-aminobutyl(trihexadecanoxysilane), 3-aminobutyl(didodecanoxy)tetradecanoxysilane, 3-aminobutyl(dodecanoxy)tetradecanoxy(hexadecanoxy)silane, 3-amino-2-methylpropyl(trimethoxysilane), 3-amino-2-methylpropyl(triethoxysilane), 3-amino-2-methylpropyl(diethoxymethoxysilane), 3-amino-2-methylpropyl(tripropoxysilane), 3-amino-2-methylpropyl(dipropoxymethoxysilane), 3-amino-2-methylpropyl(tridodecanoxysilane), 3-amino-2-methylpropyl(tritetradecanoxysilane), 3-amino-2-methylpropyl(trihexadecanoxysilane), 3-amino-2-methylpropyl(trioctadecanoxysilane), 3-amino-2-methylpropyl(didodecanoxy)tetradecanoxysilane, 3-amino-2-methylpropyl(dodecanoxy)tetradecanoxy(hexadecanoxy)silane, 3-amino-2-methylpropyl(dimethoxymethylsilane), 3-amino-2-methylpropyl(methoxydimethylsilane), 3-mercapto-2-methylpropyl(diethoxymethylsilane), 3-mercapto-2-methylpropyl(ethoxydimethylsilane), 3-mercapto-2-methylpropyl(dipropoxymethylsilane), 3-amino-2-methylpropyl(propoxydimethylsilane), 3-amino-2-methylpropyl(diisopropoxymethylsilane), 3-amino-2-methylpropyl(isopropoxydimethylsilane), 3-amino-2-methylpropyl(dibutoxymethylsilane), 3-amino-2-methylpropyl(butoxydimethylsilane), 3-amino-2-methylpropyl(diisobutoxymethylsilane), 3-amino-2-methylpropyl(isobutoxydimethylsilane), 3-amino-2-methylpropyl(didodecanoxymethylsilane), 3-amino-2-methylpropyl(dodecanoxydimethylsilane), 3-amino-2-methylpropyl(ditetradecanoxymethylsilane) or 3-amino-2-methylpropyl(tetradecanoxydimethyl-silane), triamino-functional propyltrimethoxysilane, bis(3-trimethoxysilylpropyl)amine, bis(3-triethoxysilylpropyl)amine, N-benzyl-N-(2-aminoethyl)-3-aminopropyltrimethoxysilane hydrochloride, N-benzyl-N-(2-aminoethyl)-3-aminopropyltrimethoxysilane hydroacetate, N-(n-butyl)-3-aminopropyltrimethoxysilane, 3-aminopropylmethyldiethoxysilane, N-vinylbenzyl-N-(2-aminoethyl)-3-aminopropylpolysiloxane and N-(2-aminoethyl)-3-aminopropylmethyldimethoxysilane.

Particular preference is given to using, as component (B), 3-aminopropyltrimethoxysilane (Dynasylan® AMMO), 3-aminopropyltriethoxysilane (Dynasylan® AMEO), 3-aminopropylmethyldiethoxysilane (Dynasylan® 1505), N-(n-butyl)-3-aminopropyltrimethoxysilane (Dynasylan® 1189), N-(2-aminoethyl)-3-aminopropyltrimethoxysilane (Dynasylan® DAMO), $(H_3CO)_3Si(CH_2)_3NH(CH_2)_3Si(OCH_3)_3$ (Dynasylan® 1124), $(H_5C_2O)_3Si(CH_2)_3NH(CH_2)_3Si(OC_2H_5)_3$ (Dynasylan® 1122), all from Evonik Industries AG.

It is conceivable that component (B) having a dimer content of between 0.01-20 mol %, preferably 0.1-10 mol %, based on the total amount of silicon atoms in component (B), is suitable for the inventive curing agent mixture.

The inventive curing agent mixture preferably contains, as component (C), a guanidine compound of the general formula (III).

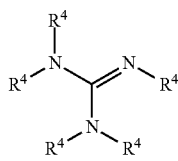

(III)

in which
$R^4$ is independently identical or different and is hydrogen, linear or branched or cyclic hydrocarbons having 1 to 15 carbon atoms, wherein the hydrocarbons may also include 1 or 2 heteroatoms.

Preferred heteroatoms are oxygen and nitrogen.

The use of component (C) in combination with other catalysts is also conceivable. Preferred catalysts are tin compounds such as tin diacetate, tin dioctoate, dibutyltin diacetylacetonate, dibutyltin dilaurate, tin tetraacetate, dibutyltin diacetate, dibutyltin dioctoate, dibutyltin dioleate, dimethoxydibutyltin, dibutyltin benzylmaleate, bis(triethoxysiloxy)dibutyltin, diphenyltin diacetate. Likewise preferred are titanium compounds such as tetraethyl orthotitanate, tetra-n-propyl orthotitanate, tetraisopropyl orthotitanate, tetra-n-butyl orthotitanate, tetraisobutyl orthotitanate, tetrakis(2-ethylhexyl) orthotitanate, titanium(IV) diisopropoxide bis(ethylacetoacetate), titanium(IV) dipropoxide bis(acetylacetonate), titanium(IV) diisopropoxide bis(acetylacetonate), titanium(IV) dibutoxide bis(acetylacetonate), tetrakis(2-ethylhexane-1,3-diolato)titanium or titanium(IV) oxyacetylacetonate. Also preferred are aliphatic metalorganic compounds such as lead diacetate, lead di-2-ethylhexanoate, lead dineodecanoate, lead tetraacetate, lead tetrapropionate, zinc acetylacetonate, zinc 2-ethylcaproate, zinc diacetate, zinc bis(2-ethylhexanoate), zinc dineodecanoate, zinc diundecenoate, zinc dimethacrylate, zirconium tetra(2-ethylhexanoate), zirconium tetramethacrylate and cobalt diacetate. Other catalysts that may be used are bismuth catalysts, for example the so-called Borchi catalyst, iron(II) and iron(III) compounds, for example iron(III) acetylacetonate or iron(II) acetate, aluminium compounds, for example aluminium acetylacetonate, calcium compounds, for example calcium ethylenediaminetetraacetate, or magnesium compounds, for example magnesium ethylenediaminetetraacetate.

The inventive curing agent mixture preferably contains, as component (C), 1,1,3,3-tetramethylguanidine or 2-tert-butyl-1,1,3,3-tetramethylguanidine.

Preferably, the inventive curing agent mixture has a viscosity, measured in accordance with DIN 53019 (as presented in the examples), of between 5 and 25 mPa·s, preferably 7-20 mPa·s, more preferably 8-15 mPa·s.

The invention further provides a process for producing the inventive curing agent mixture, in which the components (A), (B) and (C) are mixed under nitrogen.

Preferably, component (A) is initially charged, with component (B) then added with constant stirring. It is advantageous if the chosen stirrer speed is such that skin formation is prevented.

This is preferably followed by the addition of component (C). During addition of component (C), the stirrer speed must likewise be monitored to ensure that transient local overconcentrations of component (C) do not occur in the mixture of components (A) and (B).

The invention further provides for the use of the inventive curing agent mixture for curing curable compositions comprising at least one polymer that is silyl-functional.

Silyl-functional in the context of the present invention means that alkyl groups or hydrogen atoms attached to silicon via oxygen (Si—O—R groups) are present in the polymer. Also understood synonymously in the context of the present invention are silanol groups (Si—OH groups). Silyl-functional preferably means the presence of Si—O—R groups.

Polymers selected from silyl-functional polyethers, silyl-functional acrylates, silyl-functional methacrylates and silyl-functional polyesters are also conceivable. Commercially available silyl-functional polyethers are obtainable under the trade names Tegopac® and Albidur® (from Evonik Industries), Geniosil® (from Wacker) and Polymer MS® (from Kaneka).

It is also possible to use the inventive curing agent mixture for curing curable compositions containing at least one polymer that is additionally epoxy-functional. Epoxy-functional polymers of this kind are obtainable under the Silikopon® trade names (from Evonik Industries).

Advantageously and also surprisingly, it was found that component (B) in the inventive curing agent mixture does not act initially as a crosslinker. It is not until the inventive curing agent mixture has been added to a curable composition that the curing property of the inventive curing agent mixture develops. When used for curing of the curable composition, it is necessary to ensure that the amount of curing agent (component (B)) is normally within the range of 4-20% by weight and the amount of catalyst (component (C)) normally within the range of 0.2-1.0% by weight. The amount of inventive curing agent mixture can be metered in accordingly.

Without being bound to any particular theory, it is assumed that the viscosity of the inventive curing agent mixture could potentially also play a role in the stability thereof. It was observed that, in the inventive curing agent mixture, which has a relatively low viscosity, component (B) exhibits no curing property, whereas, in a curable composition, which has a higher viscosity, the curing property of component (B) was found to be present.

It is therefore preferably also possible for component (A) corresponding to the compound of the general formula (I) to be used as a curable composition.

It is known to those skilled in the art that curable compositions may contain further additives such as fillers, pigments, solvents, thickeners and/or reactive diluents. Further convenient additives may thus be added.

Preferred additives of the curable compositions may be selected from the group comprising diluents, plasticizers, fillers, solvents, emulsifiers, adhesion promoters, rheology additives, additives for chemical drying, and/or stabilizers against thermal and/or chemical stresses and/or stresses caused by ultraviolet and visible light, thixotropic agents, flame retardants, blowing agents or defoamers, deaerating agents, film-forming polymers, antimicrobial and preservative substances, antioxidants, dyes, colorants and pigments, antifreeze agents, corrosion inhibitors, fungicides, reactive diluents, complexing agents, wetting agents, co-crosslinkers, spraying aids, pharmacological active substances, fragrances, radical scavengers and/or other additives.

Suitable solvents may be selected from the group comprising alkanes, alkenes, alkynes, benzene and aromatics having aliphatic and aromatic substituents, which in turn may also be mono- or polysaturated, carboxylic esters, linear and cyclic ethers, molecules having a fully symmetrical structure, such as tetramethylsilane or, by analogy, carbon disulfide and at high pressures carbon dioxide too, halogenated aliphatic or aromatic hydrocarbons, ketones or aldehydes, lactones such as γ-butyrolactone, lactams such as N-methyl-2-pyrrolidone, nitriles, nitro compounds, tertiary carboxamides such as N,N-dimethylformamide, urea derivatives such as tetramethylurea or dimethylpropyleneurea, sulfoxides such as dimethyl sulfoxide, sulfones such as sulfolane, carbonic esters such as dimethyl carbonate, ethylene carbonate or propylene carbonate. Others that may be mentioned are protic solvents such as butanol, methanol, ethanol, n-propanol and isopropanol, and other alcohols, primary and secondary amines, carboxylic acids, primary and secondary amides such as formamide, and mineral acids.

Suitable fillers may be selected from inorganic pigments such as metal oxides (for example titanium dioxide) or spinel pigments; lamellar mica pigments.

Suitable corrosion inhibitors are for example zinc phosphates.

The invention also provides coatings, lacquers, paints, inks, coverings, sealants and adhesives obtainable through the use of the inventive curing agent mixtures.

The inventive curing agent mixtures are illustratively described hereinbelow, without any intention to limit the invention to these illustrative embodiments.

Methods
Nuclear Magnetic Resonance (NMR)

NMR spectra were measured using an Avance III 400 spectrometer from Bruker. $^{29}$Si-NMR spectra were measured at a frequency of 79 495 MHz using a PA BBO 400Si BB-H-D-10 z probe head from Bruker. The measurement time was 2569 seconds per scan, at 512 scans per spectrum.

Skin Formation

Skin formation on the surface of an open glass bottle containing curing agent mixture was assessed both visually and with the aid of a spatula. Samples were classified into 3 categories:

0—No skin or ring formed
1—Ring formation (along the glass wall at the curing agent mixture-air interface)
2—Skin formation Viscosity Measurements Viscosities were measured in accordance with DIN 53019 using an MR301 rheometer from Anton Paar having cone/plate geometry, at a shear rate of 100 s$^{-1}$ and a temperature of 25° C.

Drying Time Measurements

The drying time was determined in accordance with ASTM D5895 using a drying recorder. Standard glass strips (30×2.5×0.2 cm) were freed of adhering dirt, dust and grease with an ethanol/demineralized water mixture. A bar applicator was used to apply lacquer films having a wet film thickness of 100 µm. Using a lever on the reverse side, the slide was then shifted leftwards into the start position. The scoring scribes were then flipped down onto the sample glass plates. The test time was set to 6, 12 or 24 hours, and the measurement was started. At the end of the test time, the scoring scribes were flipped up and the glass plates were removed for assessment.

Further Conditions

Where values are expressed in % in the context of the present invention, these are in % by weight unless otherwise stated. In the case of compositions, values in % are based on the entire composition unless otherwise stated. Where averages are reported in the examples hereinbelow, these are number averages unless otherwise stated. Where measured values are reported hereinbelow, these measurements, unless otherwise stated, were determined at a pressure of 101 325 Pa, a temperature of 23° C. and the ambient relative humidity of approx. 40%.

Materials and Equipment

Dynasylan® AMEO (3-aminopropyltriethoxysilane), from Evonik Industries
Dynasylan® AMMO (3-aminopropyltrimethoxysilane), from Evonik Industries
Phenyltrichlorosilane, from Sigma-Aldrich
Decamethylcyclopentasiloxane, from Sigma-Aldrich
Methanol, from Reininghaus Chemie
Silikophen AC900 (methoxy-functional silicone resin), from Evonik Industries
Silikophen AC1000 (methoxy-functional silicone resin), from Evonik Industries
1,1,3,3-Tetramethylguanidine, from Sigma-Aldrich
Xylene, from Brenntag
Bentone SD 1 (bentonite-based rheology additive), from Elementis
Mica TM (muscovite-based lamellar filler), from Aspanger
Heucophos ZPO (zinc phosphate-based anticorrosion pigment), from Heubach
Heucodur Black 9-100 (magnetite-based black pigment), from Heubach
Aerosil R972 (surface-modified fumed silica), from Evonik Industries
Plastorit Super (leucophyllite-based filler), from Imerys Performance Additives
Butyl glycol acetate from Reininghaus Chemie 100 μm bar applicator, from Erichsen
Standard glass strips, from Gläserei Glänzer
Dispermat, from VMA Getzmann
2.2 mm glass beads, from Sigmund Lindner
BK3 drying recorder, The Mickle Laboratory Engineering

EXAMPLES

1. Preparation of Inventive Curing Agent Mixtures

For the preparation of the inventive curing agent mixtures, a methyl phenyl silicone resin is prepared by condensation of phenyltrichlorosilane and decamethylcyclopentasiloxane with water and methanol according to the method described in DE 34 12 648. The methyl phenyl silicone resin, hereinafter referred to as MP resin, has a phenyl to methyl ratio of 0.97 to 1, a methoxy content of 15.6% by weight and a viscosity of 183 mPa·s.

A 30 ml screw-capped glass bottle was initially charged first with component (A) according to the details shown in Table 1. To this was then added component (B), with stirring at 1000 rpm using a Dispermat from VMA Getzmann. This was followed by homogenization at 1000 rpm for 3 minutes. Lastly, component (C) was added, with stirring at 1000 rpm, followed by homogenization at 1000 rpm for 3 minutes. 1,1,3,3-Tetramethylguanidine (TMG) was used as component (C). CA1-CA2 are inventive curing agent mixtures. CE1-CE7 are non-inventive comparative examples.

TABLE 1

Composition of the curing agent mixtures

| Curing agent mixture | Component (A) | Component (B) | Amount (A) % by weight | Amount (B) % by weight | (A):(B) | Amount (C) % by weight |
|---|---|---|---|---|---|---|
| CA1 | Silikophen AC1000 | Dynasylan AMMO | 9.57 | 86.13 | 1:9 | 4.30 |
| CA2 | Silikophen AC1000 | Dynasylan AMMO | 19.14 | 76.56 | 1:4 | 4.30 |
| CA3 | Silikophen AC1000 | Dynasylan AMMO | 28.71 | 66.99 | 3:7 | 4.30 |
| CA4 | Silikophen AC1000 | Dynasylan AMMO | 38.28 | 57.42 | 2:3 | 4.30 |
| CA5 | Silikophen AC1000 | Dynasylan AMMO | 47.85 | 47.85 | 1:1 | 4.30 |
| CA6 | Silikophen AC1000 | Dynasylan AMMO | 57.42 | 38.28 | 3:2 | 4.30 |
| CA7 | MP resin | Dynasylan AMEO | 9.57 | 86.13 | 1:9 | 4.30 |
| CA8 | MP resin | Dynasylan AMEO | 19.14 | 76.56 | 1:4 | 4.30 |
| CA9 | MP resin | Dynasylan AMEO | 28.71 | 66.99 | 3:7 | 4.30 |
| CA10 | MP resin | Dynasylan AMEO | 38.28 | 57.42 | 2:3 | 4.30 |
| CA11 | MP resin | Dynasylan AMEO | 47.85 | 47.85 | 1:1 | 4.30 |
| CA12 | MP resin | Dynasylan AMEO | 57.42 | 38.28 | 3:2 | 4.30 |
| CE1 | Silikophen AC1000 | Dynasylan AMMO | 66.99 | 28.71 | 7:3 | 4.30 |
| CE2 | Silikophen AC1000 | Dynasylan AMMO | 76.56 | 19.14 | 4:1 | 4.30 |
| CE3 | Silikophen AC1000 | Dynasylan AMMO | 86.13 | 9.57 | 9:1 | 4.30 |
| CE4 | MP resin | Dynasylan AMEO | 66.99 | 28.71 | 7:3 | 4.30 |
| CE5 | MP resin | Dynasylan AMEO | 76.56 | 19.14 | 4:1 | 4.30 |
| CE6 | MP resin | Dynasylan AMEO | 86.13 | 9.57 | 9:1 | 4.30 |
| CE7 | — | Dynasylan AMEO | — | 95.70 | — | 4.30 |

1.1 Assessment of Stability

The 30 ml screw-capped glass bottle was first visually examined for turbidity. A turbid sample was judged to be unstable. The screw-capped glass bottle was then opened and left to stand at 23° C. and approx. 40% atmospheric humidity. After 24 hours, the stability was assessed according to the above scale. The results of the assessment of stability are shown in Table 2.

TABLE 2

Stability of the curing agent mixtures

| Curing agent mixture | Assessment of stability immediately after preparation | Assessment of stability after 24 h |
|---|---|---|
| CA1 | Clear | 0 |
| CA2 | Clear | 0 |
| CA3 | Clear | 0 |
| CA4 | Clear | 0 |
| CA5 | Clear | 0 |
| CA6 | Clear | 0 |
| CA7 | Clear | 0 |
| CA8 | Clear | 0 |
| CA9 | Clear | 0 |
| CA10 | Clear | 0 |
| CA11 | Clear | 0 |
| CA12 | Clear | 0 |
| CE1 | Clear | 1 |
| CE2 | Turbid | 2 |
| CE3 | Turbid | 2 |
| CE4 | Clear | 1 |
| CE5 | Clear | 2 |
| CE6 | Clear | 2 |
| CE7 | Clear | White precipitate |

It was found that the inventive curing agent mixtures showed no turbidity and remained stable after 24 hours of open storage. No separation and no formation of a skin or precipitate were observed. The inventive curing agent mixtures are homogeneous.

1.2 Development of Viscosity

A further experiment examined the development of viscosity. The inventive curing agent mixtures were prepared in analogous manner to the inventive method as described above using the amounts stated in Table 1. The curing agent mixtures prepared were stored in closed 30 ml screw-capped glass bottles at 40° C. and their viscosity determined at the time intervals shown in Tables 3 and 4.

TABLE 3

| Development of viscosity (mPa · s) after closed storage at 40° C. | | |
|---|---|---|
| Weeks | CA5 | CA11 |
| 0 | 9 | 10 |
| 1 | 9 | 10 |
| 2 | 9 | 10 |
| 4 | 8 | 11 |
| 8 | 9 | 11 |
| 16 | 9 | 10 |

It was found that the viscosity of the inventive curing agent mixtures remained broadly constant.

1.3 Assessment of Stability Based on Dimerization of Dynasylan AMEO (Component (B))

An inventive curing agent mixture was prepared according to Table 6 and divided equally between two 30 ml screw-capped glass bottles (D1 and D2). D2 was exposed to atmospheric humidity of 40% for one hour at room temperature. D1 was closed immediately. CD1 and CD2 were prepared in analogous manner and exposed to the text condition, with component (A) omitted here. In the case of Dynasylan AMEO, a batch in its original packaging was used.

TABLE 5

| Composition of samples for $^{29}$Si NMR | | | | |
|---|---|---|---|---|
| Sample name | MP resin % by weight | Dynasylan AMEO % by weight | Tetramethyl-guanidine % by weight | Atmospheric humidity |
| CD1 | — | 97.0 | 3.0 | No |
| CD2 | — | 97.0 | 3.0 | Yes |
| D1 | 50.0 | 47.0 | 3.0 | No |
| D2 | 50.0 | 47.0 | 3.0 | Yes |

$^{29}$Si-NMR spectra of the individual mixtures were measured;
these are shown in FIGS. 1-4. A further $^{29}$Si-NMR spectrum of component (A) is shown in FIG. 5.

FIG. 1 shows the $^{29}$Si-NMR spectrum of CD1. A small signal at −53 ppm indicates a small amount of dimer in the raw material.

Figure 2:
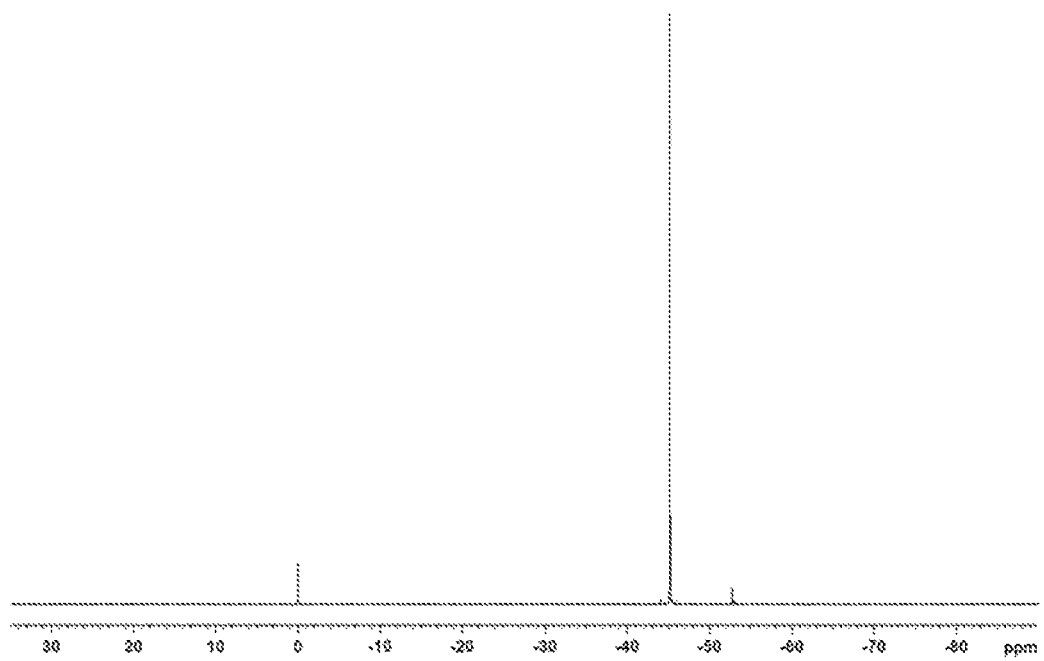
FIG. 2 shows the $^{29}$Si-NMR spectrum of CD2. Contact with atmospheric humidity results in an appreciably stronger measured signal in the same place. From this it can be concluded that reaction with water from the ambient air resulted in the formation of further dimers, this being catalysed by 1,1,3,3-tetramethylguanidine.

FIG. 2 shows the $^{29}$Si-NMR spectrum of CD2. Contact with atmospheric humidity results in an appreciably stronger measured signal in the same place. From this it can be concluded that reaction with water from the ambient air resulted in the formation of further dimers, this being catalysed by 1,1,3,3-tetramethylguanidine.

Figure 3:
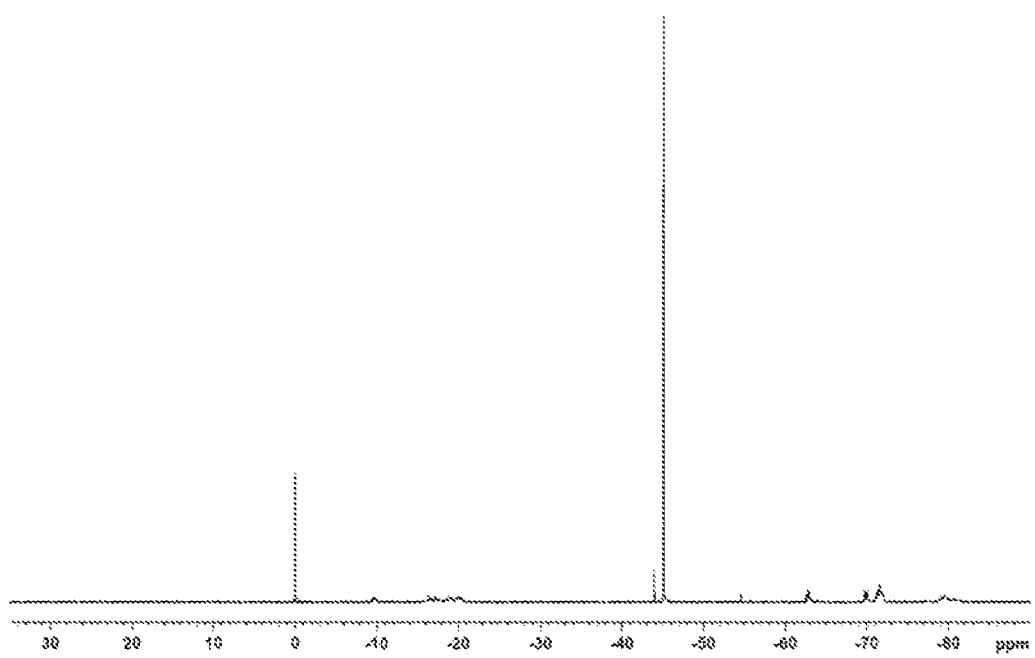
FIG. 3 shows the $^{29}$Si-NMR spectrum of D1. There was no measured signal at −53 ppm. The signal at −55 ppm can be attributed to the pure silicone resin.

FIG. 3 shows the $^{29}$Si-NMR spectrum of D1. There was no measured signal at −53 ppm. The signal at −55 ppm can be attributed to the pure silicone resin.

Figure 4:
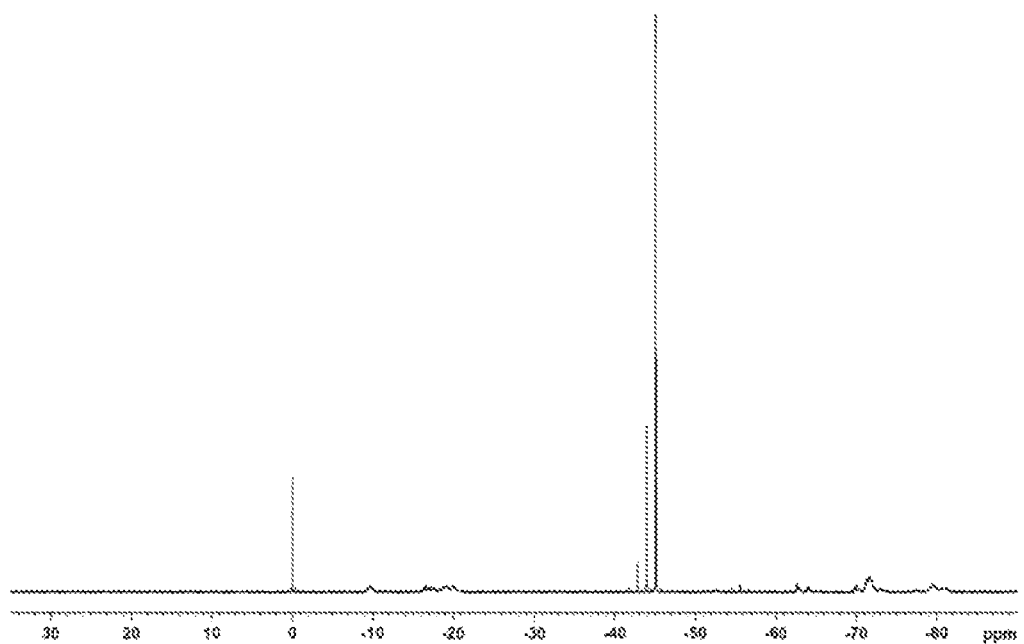
FIG. 4 shows the $^{29}$Si-NMR spectrum of D2. Although the mixture was exposed to atmospheric humidity, here too no signal at −53 ppm is visible.
Figure 5:
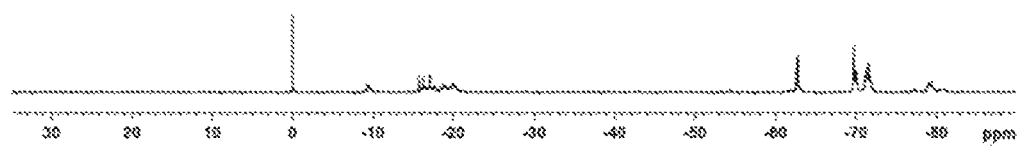
FIG. 5 shows the $^{29}$Si-NMR spectrum of MP resin. There is a weak measured signal at −55 ppm. No signal at −53 ppm is observed. The spectrum of the MP resin therefore does not conceal any signals attributable to Dynasylan AMEO dimers.

FIG. 4 shows the $^{29}$Si-NMR spectrum of D2. Although the mixture was exposed to atmospheric humidity, here too no signal at −53 ppm is visible.

FIG. 5 shows the $^{29}$Si-NMR spectrum of MP resin. There is a weak measured signal at −55 ppm. No signal at −53 ppm is observed. The spectrum of the MP resin therefore does not conceal any signals attributable to Dynasylan AMEO dimers.

The $^{29}$Si-NMR spectrum can be used to demonstrate the stability of the inventive curing agent mixture in respect of the concentration of Dynasylan AMEO dimers.

2. Application Examples 2.1 Clearcoat

Clearcoats were prepared with the inventive curing agent mixtures and the drying times thereof measured. Firstly, various curing agent mixtures were prepared according to Table 6. 1,1,3,3-Tetramethylguanidine was used as component (C). The clearcoat was prepared using the amounts stated in Table 7 at 1000 rpm for 5 minutes with the aid of a Dispermat. For the determination of the drying time, it was applied to standard glass strips immediately after preparation. The time taken for surface drying and complete drying is likewise shown in Table 7.

TABLE 6

| Curing agent mixtures | | | | | | |
|---|---|---|---|---|---|---|
| Curing agent mixture | Component (A) | Component (B) | Amount (A) % by weight | Amount (B) % by weight | (A):(B) | Amount (C) % by weight |
| CA13 | MP resin | Dynasylan AMEO | 47.65 | 47.65 | 1:1 | 4.70 |
| CA14 | MP resin | Dynasylan AMMO | 47.65 | 47.65 | 1:1 | 4.70 |
| CA15 | MP resin | Dynasylan AMEO | 24.25 | 72.75 | 1:3 | 3.0 |
| CA16 | MP resin | Dynasylan AMEO | 32.33 | 64.67 | 1:2 | 3.0 |
| CA17 | MP resin | Dynasylan AMEO | 48.50 | 48.50 | 1:1 | 3.0 |
| CA18 | MP resin | Dynasylan AMMO | 24.25 | 72.75 | 1:3 | 3.0 |
| CA19 | MP resin | Dynasylan AMMO | 32.33 | 64.67 | 1:2 | 3.0 |
| CA20 | MP resin | Dynasylan AMMO | 48.50 | 48.50 | 1:1 | 3.0 |

TABLE 7

Drying time of clearcoat

| Coating | Resin | Curing agent mixture | Resin: Curing agent mixture | Surface drying [h] | Complete drying [h] |
|---|---|---|---|---|---|
| 1 | Silikophen AC900 | CA13 | 83:17 | 1 | 3 |
| 2 | Silikophen AC900 | CA14 | 83:17 | 1 | 2 |
| 3 | MP resin | CA13 | 83:17 | 2 | 5 |
| 4 | MP resin | CA14 | 83:17 | 2 | 3 |
| 5 | MP resin | CA15 | 80:20 | 2 | 10 |
| 6 | MP resin | CA16 | 80:20 | 3 | 5 |
| 7 | MP resin | CA17 | 80:20 | 3 | 4 |
| 8 | MP resin | CA18 | 80:20 | 2 | >10 |
| 9 | MP resin | CA19 | 80:20 | 2 | >10 |
| 10 | MP resin | CA20 | 80:20 | 2 | 6 |
| 11 | MP resin | CA15 | 85:15 | 3 | 8 |
| 12 | MP resin | CA16 | 85:15 | 3 | 8 |
| 13 | MP resin | CA17 | 85:15 | 3 | 10 |
| 14 | MP resin | CA18 | 85:15 | 3 | 5 |
| 15 | MP resin | CA19 | 85:15 | 3 | 7 |
| 16 | MP resin | CA20 | 85:15 | 4 | 6 |
| 17 | MP resin | CA15 | 90:10 | 4 | >10 |
| 18 | MP resin | CA16 | 90:10 | 4 | >10 |
| 19 | MP resin | CA17 | 90:10 | 4 | >10 |
| 20 | MP resin | CA18 | 90:10 | 5 | 8 |
| 21 | MP resin | CA19 | 90:10 | 5 | 8 |
| 22 | MP resin | CA20 | 90:10 | 5 | >10 |

The examples demonstrate that the inventive curing agent mixtures may be used for curing a clearcoat.

2.2 Black Lacquer

A black lacquer was prepared with the aid of a Lau Disperser DAS 200 device and 2.2 mm glass beads. The raw materials and amounts used are shown in Table 8.

TABLE 8

Composition of the black lacquer

| Raw material | % by weight |
|---|---|
| Silikophen AC 900 | 31.5 |
| Xylene | 16.0 |
| Bentone SID 1 | 1.0 |
| Mica TM | 17.0 |
| Heucophos ZPO | 10.0 |
| Heucodur Black 9-100 | 12.0 |
| Aerosil R972 | 1.2 |
| Plastorit Super | 9.0 |
| Butyl glycol acetate | 2.3 |

The raw materials were weighed into 500 ml screw-capped glass bottles in the indicated order and then dispersed for 2 hours. The glass beads were then filtered off. The black lacquer was mixed with the inventive curing agent mixtures CA13 and CA14 in a ratio of 5:1 and then stirred at 1000 rpm for 5 minutes with the aid of a Dispermat. For the determination of the drying time, the black lacquer was applied to standard glass strips immediately after preparation. The time taken for surface drying and complete drying is shown in Table 9.

TABLE 9

Drying time of the black lacquer (hours)

| Curing agent | Surface drying | Complete drying |
|---|---|---|
| CA13 | 1 | 1 |
| CA14 | 1 | 1 |

The example demonstrates that the inventive curing agent mixtures may be used for curing a pigmented black lacquer.

The invention claimed is:

1. A curing agent mixture for coatings that cure at room temperature, the curing agent mixture consisting of:
   (A) 10-60% by weight of a polysiloxane,
   (B) 40-90% by weight of an amino-functional alkoxysilane, and
   (C) 1-10% by weight of a guanidine compound,
   wherein (A), (B), and (C) add up to 100% by weight and are based on the curing agent mixture.

2. The curing agent mixture according to claim 1, wherein a weight ratio A:B is from 1:9 to 3:2.

3. The curing agent mixture according to claim 1, wherein the component (A) is a compound of the general formula (I):

$$R_aSi(OR')_bO_{(4-a-b)/2} \quad (I),$$

in which
   a and b are independently greater than 0 to less than or equal to 2, and a+b is less than 4,
   R is independently identical or different linear or branched, saturated or else mono- or polyunsaturated or aromatic hydrocarbon radicals, and
   R' is an alkyl group comprising 1 to 8 carbon atoms.

4. The curing agent mixture according to claim 3, wherein component (A) is a compound of the general formula (I), wherein R is at least one selected from the group consisting of a phenyl group and a methyl group, and R' is a methyl group.

5. The curing agent mixture according to claim 4, wherein a numerical phenyl to methyl ratio, based on the number of moles in component (A), is in a range from 1:0.1 to 0.1:1.

6. The curing agent mixture according to claim 1, wherein component (B) is an amino-functional alkoxysilane of the general formula (II):

$$R^1_2-N-R^3-SiR^1_x(OR^2)_{3-x} \quad (II)$$

wherein
   $R^1$ is identically or independently hydrogen, an alkyl, isoalkyl, tert-alkyl, cycloalkyl or aryl group having 1-10 carbon atoms, $NH_2-(CH_2)_2-$, or $(R^2O)_3Si-R^3-$,
   wherein x=0, 1, or 2,
   $R^2$ is independently hydrogen or an alkyl or isoalkyl group having 1-8 carbon atoms, and
   $R^3$ is a linear or branched alkylene group having 1-20 carbon atoms.

7. The curing agent mixture according to claim 1, wherein component (B) is 3-aminopropyltriethoxysilane, 3-aminopropyltrimethoxysilane, 3-aminopropylmethyldiethoxysilane, N-(n-butyl)-3-aminopropyltrimethoxysilane, N-(2-aminoethyl)-3-aminopropyltrimethoxysilane, bis[3-triethoxysilylpropyl]amine, bis[3-trimethoxysilylpropyl]amine, or bis[3-trimethoxysilylpropyl-N-ethyl]amine.

8. The curing agent mixture according to claim 1, wherein component (C) is a guanidine compound of the general formula (III):

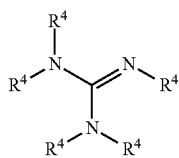
(III)

in which

R⁴ is independently identical or different hydrogen or linear, branched, or cyclic hydrocarbons having 1 to 15 carbon atoms, wherein the hydrocarbons optionally include 1 or 2 heteroatoms.

9. The curing agent mixture according to claim 1, wherein component (C) is 1,1,3,3-tetramethylguanidine or 2-tert-butyl-1,1,3,3-tetramethylguanidine.

10. The curing agent mixture according to claim 1, wherein the viscosity is measured in accordance with DIN 53019 and is between 5-25 mPa·s.

11. A method for producing the curing agent mixture according to claim 1, the method comprising:
mixing component (A), component (B), and component (C) under nitrogen.

12. The method according to claim 11, further comprising:
initially charging component (A),
subsequently adding component (B) with constant stirring, and
subsequently adding component (C).

13. A method, comprising:
curing a curable composition, comprising at least one polymer that is silyl-functional, with the curing agent mixture according to claim 1.

14. A method, comprising:
curing a curable composition, comprising the compound of the general formula (I), with the curing agent mixture according to claim 3.

15. A composition, comprising:
the curing agent mixture according to claim 1,
wherein the composition is selected from the group consisting of a coating, a lacquer, a paint, an ink, a covering, a sealant, and an adhesive.

16. The curing agent mixture according to claim 1, consisting of:
(A) 30-50% by weight of the polysiloxane,
(B) 40-70% by weight of the amino-functional alkoxysilane, and
(C) –3-5% by weight of the guanidine compound.

17. The curing agent mixture according to claim 2, wherein the weight ratio A:B is from 3:7 to 3:2.

18. The curing agent mixture according to claim 5, wherein the numerical phenyl to methyl ratio, based on the number of moles in component (A), is in a range from 0.5:1 to 1:0.5.

19. The curing agent mixture according to claim 8, wherein the heteroatoms are selected from the group consisting of oxygen and nitrogen.

20. The curing agent mixture according to claim 10, wherein the viscosity measured in accordance with DIN 53019 is between 8-15 mPa·s.

21. The composition according to claim 15, further comprising one or more fillers, pigments, solvents, thickeners, additives, and/or diluents.

22. The composition according to claim 15, further comprising an additional catalyst.

* * * * *